No. 843,147. PATENTED FEB. 5, 1907.
J. A. HYLE.
NUT AND BOLT LOCK.
APPLICATION FILED APR. 25, 1906.
Fig. 1.
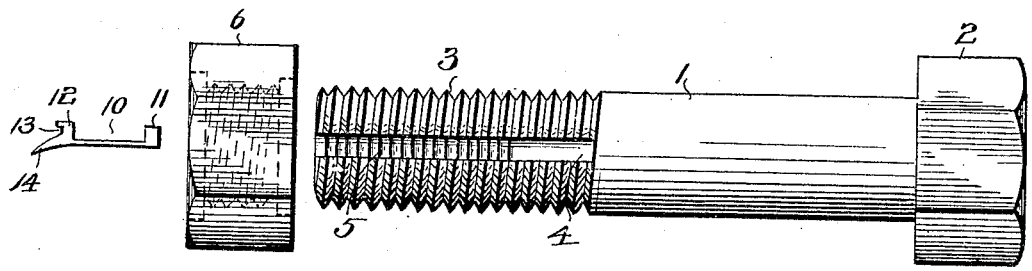
Fig. 2.
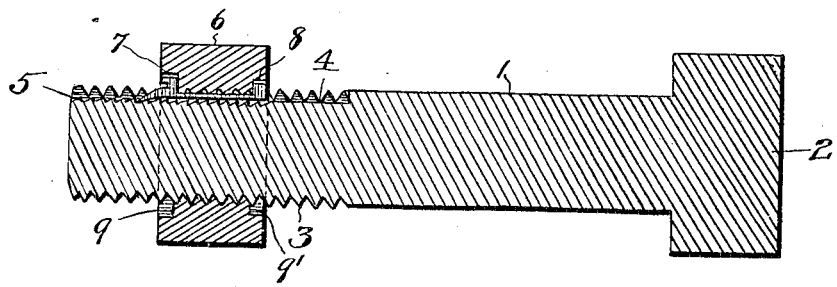
Fig. 3. Fig. 4.
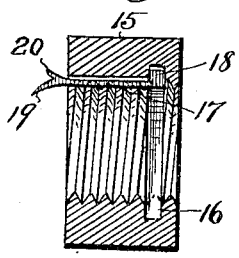 
Witnesses
Jas. H. Blackwood
W. O. Blackwood
Inventor
Jacob A. Hyle
By Jas. L. Skidmore
his Attorney

UNITED STATES PATENT OFFICE.

JACOB A. HYLE, OF ALTOONA, PENNSYLVANIA, ASSIGNOR OF THREE-FIFTHS TO FREDERICK HESSER, OF ALTOONA, PENNSYLVANIA.

NUT AND BOLT LOCK.

No. 843,147.     Specification of Letters Patent.     Patented Feb. 5, 1907.

Application filed April 25, 1906. Serial No. 313,641.

*To all whom it may concern:*

Be it known that I, JACOB A. HYLE, a citizen of the United States, residing at Altoona, in the county of Blair and State of Pennsylvania, have invented certain new and useful Improvements in Nut and Bolt Locks, of which the following is a specification.

My invention relates to nut-locks to be utilized for various purposes, but is especially designed for use in connection with locomotives and moving vehicles.

The prime object of my invention is to provide simple and durable yet reliable and efficient means for locking a nut on a bolt in such a manner that the nut cannot be accidentally or unintentionally removed, but by proper manipulation the nut may easily and readily be removed from the bolt when desired.

Another object is to so construct a bolt, nut, and locking device or pawl that when they are connected or fitted together the several parts or members coact not only to prevent the loosening and accidental removal of the nut, but tend to tighten and bind the assembled parts together.

A further object of my invention is to provide a novel construction of nut and locking device fitted thereto, whereby the nut shall constitute the propelling means for the locking device when both applying and removing the nut from the bolt.

A still further object is to furnish means forming a runway for the locking device or pawl during the operation of removing the nut from the bolt.

The above and such other objects as may occur from the ensuing description are attained by the improvement illustrated by the accompanying drawings, and more fully pointed out in the appended claims.

In the accompanying drawings, Figure 1 illustrates in side elevation a view of the several elements or members embodying my invention shown in a disassociated position. Fig. 2 is a longitudinal section of the bolt and nut, showing the several members, including the locking device, in the associated or assembled position. Fig. 3 represents a sectional view of a slightly-modified construction of nut with a modified form of locking device or pawl connected thereto. Fig. 4 illustrates in perspective a view of a suitable tool or runway for use when removing the nut from the bolt.

The reference-numeral 1 represents a bolt having a suitable head 2 and provided throughout a portion of its length with screw-threads 3, as is usual. The bolt has formed therein a longitudinal groove 4, extending from the end of its threaded portion to a suitable distance toward the head of the bolt. This groove 4 extends inwardly a short distance below the bottom of the bolt-threads, and in the bottom of the groove through a suitable distance of its length is formed a series of ratchet-teeth 5, for the purpose hereinafter more fully set forth.

6 indicates a nut adapted to be fitted to the threaded portion of the bolt, and the front and rear faces or surfaces are reamed or milled out, as shown at 7 and 8, Fig. 2, thereby forming walls or shoulders 9 and 9'. Fitted within the nut is a key 10, made of steel or any other suitable metal, provided at its rear end with a projection 11 and at its front end with a projection 12, an intermediate yielding body portion, an undercut portion 13, and a member extending downward and forward, forming a pawl or locking portion 14 for engaging the ratchet-teeth 5 in the bolt.

As clearly shown in Fig. 2 of the drawings, it will be seen that the steel key or locking device 10 is located in the longitudinal groove in the bolt, the projection 11 of said locking device being adapted to contact with the surface 9' of the nut, the projection 12 resting against the shoulder or surface 9 of said nut, and the pawl member 14 engaging one of the ratchet-teeth in said groove 4, while the yielding body portion occupies a position between the threads of the nut and the ratchet-teeth 5, formed at the bottom of the groove. Thus the locking device is held in the grooveway by the nut and is manipulated backward or forward by the nut, owing to contact of the projections 11 and 12 with the shoulders or surfaces 9' and 9, respectively, on the nut.

It will be obvious that in assembling the parts it is simply necessary to place the locking-key within the nut, so that the projections 11 and 12 contact with the shoulders 9' and 9 on the nut, as shown in Fig. 2. Then aline the locking-key with the longitudinal groove in the bolt and run the nut on the threaded end of said bolt. As the nut is screwed on the bolt it will carry the locking-key with it, owing to the contact of the projection 11 on the key with the shouldered surface 9' of the nut, and the pawl member or end 14 of the key will travel along the longitudinal groove and over the ratchet-teeth until the nut has been properly adjusted. Since the pawl end of the key normally rests between the ratchet-teeth, any forward tendency of the nut will cause the pawl to firmly contact with one of the teeth, thereby preventing the unintentional removal of the nut. In the event the nut should become loose the jolting or jarring of the same will have a tendency to cause the pawl to ride over the teeth in a rearward direction and tighten the nut, owing to the inclination of the ratchet-teeth and the downwardly-extending pawl end 14 of the locking-key.

The modification, Fig. 3, shows a nut 15, provided with an interior annular groove 16 near one end thereof, and to said groove is fitted a projected portion 18 of the key 17. This key 17 is made of steel, the body comprising a flat yielding portion, its forward end formed with a spur 20 and a pawl member 19.

The tool or device, Fig. 4, represents a thin flat strip of sheet-steel 21, preferably sharpened or thinner at one end 22. This tool or device is intended to be used only when it is desired to remove the nut from the bolt.

When it is desired to remove the nut from the bolt, any suitable device may be used that will fit the undercut portion 13 of the locking-key, so as to lift or raise the pawl end of the key sufficiently high as to permit the sharpened or thin end of the tool 21 to be inserted beneath the pawl end of the key. This tool, having a plain smooth surface and resting in the longitudinal groove, serves as a runway for the key in removing the nut and prevents contact of the pawl with the ratchet-teeth. As the nut is moved forward for the purpose of removing the same from the bolt the shouldered portion 9 of the nut contacts with the projection 12 on the locking device and propels the latter along with the nut, as will be clearly understood.

Having thus described my invention, what I desire to claim and secure by Letters Patent is—

1. A device for locking nuts to bolts, including a bolt provided with a longitudinal groove, said groove having ratchet-teeth at the bottom thereof, a nut formed with an annular shoulder, and a locking-key provided with a rigid projection adapted to contact with said annular shoulder during both the adjustment and removal of the nut, said key having an undercut portion at one end thereof, an intermediate yielding portion, and a downwardly-projected end for engaging said ratchet-teeth, substantially as specified.

2. The combination, with a bolt having a longitudinal groove in the threaded portion thereof provided with a series of ratchet-teeth, of a nut formed with an annular shoulder on both its front and rear faces, and a locking-key provided with a rigid lug or projection at or near each end thereof adapted to contact with the annular shoulders on the nut during both the adjustment and removal of said nut, and a downwardly-extended end for engaging the ratchet-teeth, substantially as specified.

3. The combination, with a bolt having a longitudinal groove in the threaded portion thereof provided with ratchet-teeth, of a nut formed with an annular shoulder on both its front and rear faces, a locking-key provided with a projection at each end thereof adapted to contact with the said annular shoulders on the nut, said key having an intermediate yielding portion, an undercut portion, and a downwardly-extended portion for engaging the ratchet-teeth, substantially as described and for the purposes set forth.

4. A device for locking nuts and bolts, comprising a bolt provided with a longitudinal groove throughout the threaded portion thereof, said groove having ratchet-teeth at its bottom, a nut formed with an annular shoulder on both its front and rear faces, a locking-key located between the nut and said ratchet-teeth, said locking-key comprising a rear projection, a forward projection, an intermediate yielding body portion, an undercut or recessed portion, and a downwardly and forwardly projected portion for engaging the ratchet-teeth in the longitudinal groove of the bolt, all substantially as described and for the purpose set forth.

JACOB A. HYLE.

In presence of—
Geo. A. Do Byne,
J. Austin Sullivan.